Jan. 9, 1951

H. ALLEN

PRESSURE GAUGE 2,537,729

Original Filed Nov. 26, 1940

Herbert Allen
INVENTOR

Patented Jan. 9, 1951

2,537,729

UNITED STATES PATENT OFFICE 2,537,729

PRESSURE GAUGE

Herbert Allen, Houston, Tex., assignor to Cameron Iron Works, Houston, Tex., a corporation of Texas Original application November 26, 1940, Serial No. 367,160. Divided and this application February 9, 1945, Serial No. 576,957

6 Claims. (Cl. 73—410)

This application is a division of my prior co-pending application Serial No. 367,160, filed November 26, 1940 for Pressure Gauge which matured into United States Letters Patent No. 2,369,650, issued February 20, 1945.

This invention relates to a pressure responsive assembly suitable for use in pressure gauges and has for its general object the provision of a pressure responsive assembly having the frictionless characteristics of a Bourdon tube type pressure responsive means with the desirable ruggedness and power available in other types of gauges, such as piston gauges.

It is well known that a piston type of pressure responsive assembly is more desirable from the standpoint of positive and powerful movement under pressure than is a Bourdon tube type of device, but that it is very difficult if not impossible to pack a piston type pressure responsive assembly without the introduction of frictional or other resistance characteristics which substantially impair or destroy the desirable characteristics of the piston type assembly.

It is, therefore, an object of this invention to provide a substantially frictionless seal between the load member of an elastic system and a pressure gauge body.

Another object of this invention is to provide such a seal which will be distorted a minimum amount over a wide range of pressures being gauged.

Another object of this invention is to provide a means for sealing a pressure gauge in which the weakest part of the sealing means is substantially relieved of unbalanced forces tending to rupture it by a shearing action.

Another object of this invention is to provide a means for sealing a movable element of a pressure gauge positively against the escape of liquid or other pressure fluid, while substantially eliminating any possible modification of the action of the pressure gauge by the sealing means.

Other objects and advantages of this invention will become apparent from the following description taken in connection with the accompanying drawing in which is set forth by way of illustration one embodiment of the invention.

Figure 1:
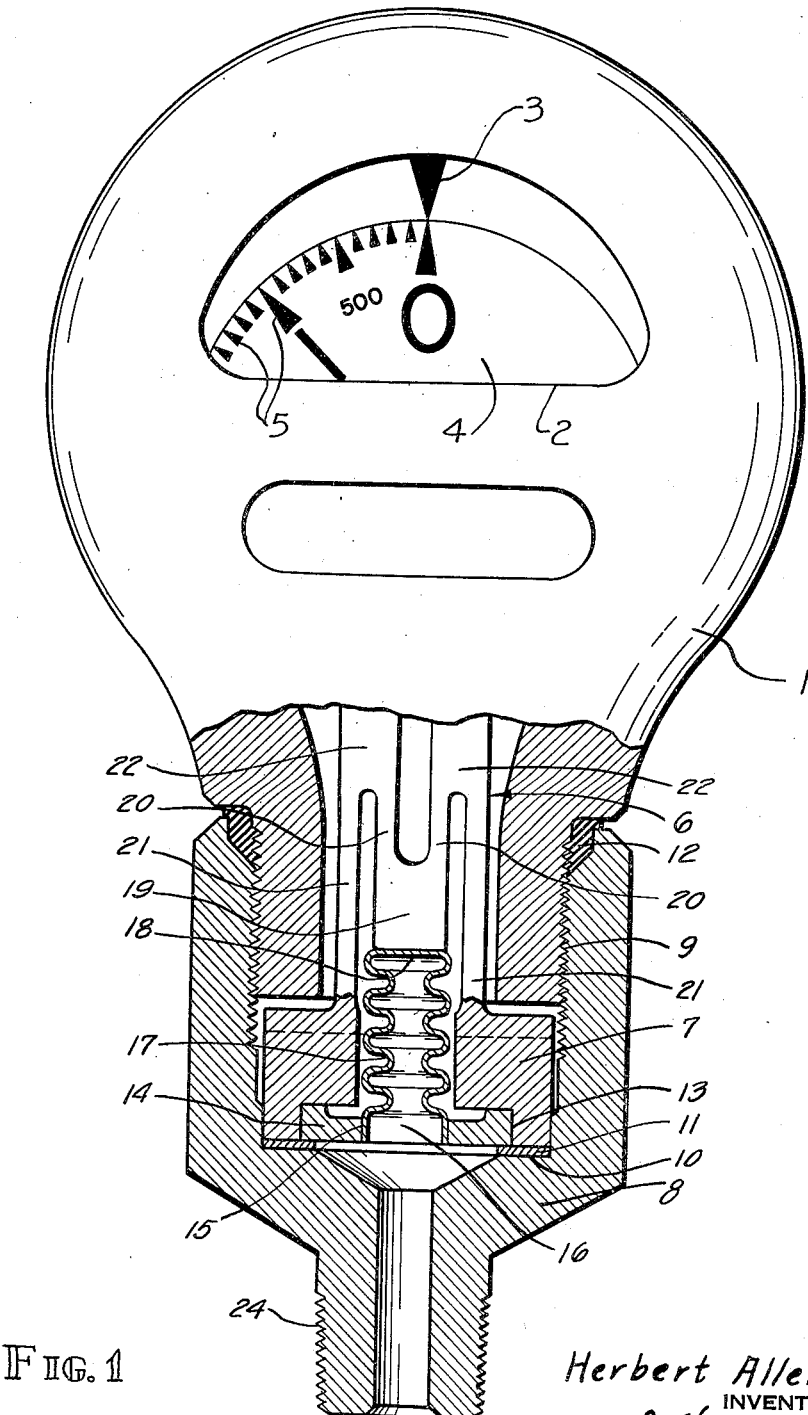
Fig. 1 is a view partly in side elevation and partly in vertical cross section illustrating a pressure gauge constructed in accordance with this invention.

Referring more in detail to the drawing, the pressure gauge consists of a housing 1 having a window 2 therein through which is visible a zero mark 3 opposed to an indicator disk 4 having indicating marks 5 thereon adapted to pass successively by the index mark 3 as the pressure gauge is operated. This indicator disk 4 is adapted to be moved by the action of an elastic system 6 carried on a relatively rigid base member 7 clamped within the base 8. The base 8 is threaded as indicated at 9 whereby it may be connected to the housing 1, and the rigid portion 7 is adapted to be secured against the shoulder 10 of the base 8 with a gasket 11 interposed between the member 7 and the shoulder 10 for the purpose of providing a seal between these parts. A seal is provided between the base 8 and the housing 1 at the upper end of the threaded section 9 by means of a sealing ring 12 of rubber or any other suitable packing substance.

The rigid member 7 is provided with a countersink in its lower surface and with an opening through its central part, and an apertured flexible member in the form of an annular elastic disk 14 is disposed within this countersink 13 and held in place therein as well as being sealed therein by clamping against the shoulder 10 with the gasket 11 interposed between the shoulder 10 on the one hand and the rigid member 7 and the flexible member 14 on the other hand. This annular elastic member or disk 14 is thus clamped about its outer edges while its central portion is left free to flex.

An opening 15 is formed through the central portion of this annular elastic member and in this opening is secured the lower end 16 of a bellows or Sylphon 17. It will be appreciated that the lower end of this bellows or Slyphon might be secured either within the opening itself or to one or the other face of the member 14 adjacent the opening, but that being secured to the member 14 adjacent the opening or in the opening, there will be only one necessary point of flexure of the material of the Sylphon instead of two annular lines of flexure which would exist in the case of a diaphragm clamped at the edge of the member 14.

This Sylphon 17 is illustrated as being closed at its upper end shown at 18, and formed to contact the lower end of a pressure pin or rod 19 forming a part of the elastic system 6 of the indicator mechanism. This elastic system is clearly apparent in Fig. 2 and consists of two relatively narrow flexible parts 20 extending upwardly from the upper end of the substantially rigid part 19 and merging at their upper ends with the upstanding arms 21 to form the posts 22. A linkage for actuating the indicator disk 4 is secured to the upper end of these posts respectively by means of bolts or the like passed through openings 23. The nature of this linkage forms no part of the present invention and is therefore not illustrated, it being understood that any suitable mechanical linkage might be used for connecting these parts.

The base 8 is adapted for connection to a pressure vessel by means of threads 24 on its lower end.

Figure 2:
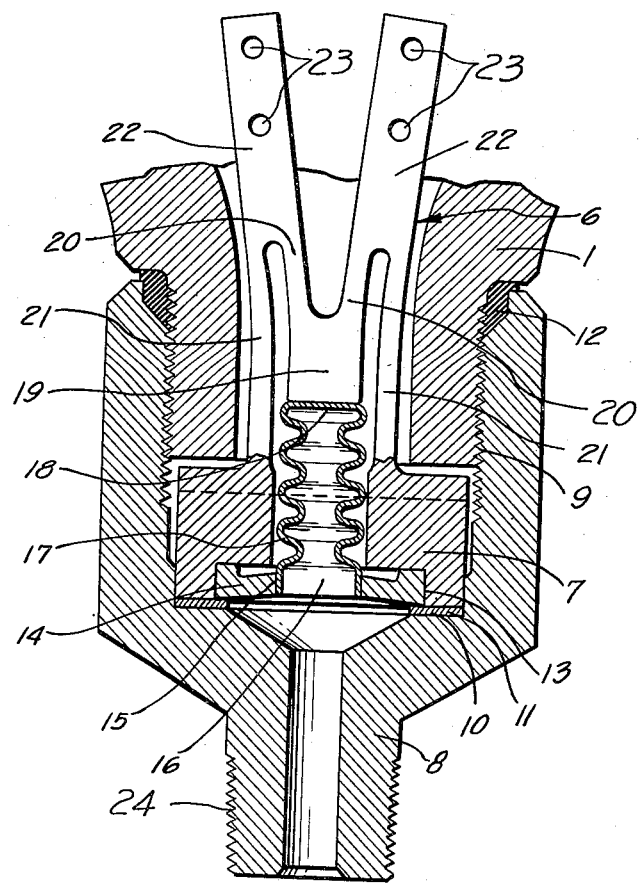
Fig. 2 is a view similar to the lower portion of Fig. 1 but showing the parts of the pressure gauge in the position they occupy when the gauge is subjected to substantial pressure.

In operation, the fluid under pressure is admitted to the space within the base 8 below the flexible member 14 and within the Sylphon 17. It will be seen that the flexible member 14 will flex under such pressure, its central portion about the opening 15 moving upwardly as seen in Fig. 2. At the same time, the force of the pressure within the base 8 will be exerted on the inner surface of the upper end of the Sylphon and transmitted thereby directly to the movable element 19 of the elastic system of the gauge. The parts are preferably so designed that under the same pressure, that portion of the element 14 about the opening 15 will flex substantially to the same extent that the part 19 will be moved. Thus, when pressure is exerted upon the parts illustrated, the part of the element 14 to which the Sylphon is secured, and the part 19 of the elastic system 6 will move substantially to the same extent and in the same direction and there will be substantially no elongation or flexing of the Sylphon. This leaves the element 19 free to move without interference and under no substantial influence other than that exerted by the pressure of the fluid being gauged. The Sylphon 17 serves substantially no other purpose than to provide a seal between the movable edge of the element 14 about the opening 15, and the movable part 19 of the elastic system 6. While the Sylphon is illustrated as being closed at its upper end 18 it will be appreciated that any other suitable arrangement might be employed which would result in the force from the pressure exerted through the opening 15 being applied directly to the end of the rigid bodily movable part or load rod 19. It will further be appreciated that since the pressure of the fluid is transmitted directly through the wall 18 at the upper end of the Sylphon to the part 19 of the elastic system 6, the pressure of the fluid will not elongate the Sylphon and the Sylphon will as a matter of fact retain substantially the same length regardless of the pressure being gauged. For this reason the unbalanced stresses to which the Sylphon is subjected will be principally radial stresses tending to enlarge the Sylphon, and against such stresses a Sylphon such as illustrated is capable of very strong resistance.

In such a structure it will be seen that the bellows will move as a unit and will serve principally as a flexible seal between the flexible or elastic annular element 14 and the elastic system 6, but in such a manner that it will not be substantially flexed during use and will hence exert substantially no restraining or modifying influence upon the movement of the element 19 under the pressure being gauged.

It will thus be seen that a means has been provided whereby all of the objects and advantages set forth in connection with this invention have been attained.

Having described my invention, I claim:

1. In a pressure gauge, the combination of an apertured resilient means firmly held at its periphery, a load rod movable in response to pressure applied thereto, said resilient means and load rod being so constructed and arranged as to be movable independently of each other but in substantially equal amounts in the same direction in response to any given pressure, and a bellows having an open end secured to said resilient means about said aperture therein and extending to and in contact with an end portion of said rod for providing a flexible seal between said resilient means and said rod.

2. In a pressure gauge, a hollow body, an elastic means having a peripheral part anchored and sealed to said body, said elastic means having an opening and one surface surrounding the opening exposed to pressure within the body, a second elastic means having a part anchored to said body and a part exposed to the force of the pressure through said opening, flexible sealing means secured to said first means about said opening and to said part exposed to pressure to seal between said first means and the last mentioned part of said second means, said two elastic means responsive in the same degree to pressure whereby the condition of the sealing means is not substantially altered by pressure variations, and indicating means operatively connected to said second elastic means for indicating flexure thereof.

3. In a pressure gauge, the combination of a housing having a passage, an elastic closure for said passage and subject on one side to the pressure to be gauged and having an opening therethrough, an elastic system on the opposite side of said closure including a bodily movable part responsive to the pressure, said elastic closure and elastic system being of such design that the portion of said elastic closure about said opening will move substantially the same amount as the bodily movable part of said elastic system upon the application of pressure, and a flexible sealing means sealed to said elastic closure about said opening and connected to the bodily movable part to form a flexible seal between said elastic closure and said bodily movable part, the latter being exposed to the force of the pressure within the sealing means and closure.

4. In a pressure indicator of the type having a load pin disposed in the passage of a gauge body, said pin movable in response to pressure and operably connected to a pressure indicator the improvement which resides in a seal for the load pin comprising an apertured elastic member secured and sealed at its outer periphery to the gauge body, said member adapted to respond to pressure so that a part thereof will move in response to pressure at substantially the same rate and direction as does the load pin, and a flexible sealing means between said part of the apertured member and the load pin completing closure of the passage whereby free movement of the load pin in the passage in response to pressure is provided.

5. A seal adaptable for use in conjunction with the load pin of the elastic system of a pressure gauge disposed in the passage of a gauge body comprising an elastic apertured member disposed in the passage and having its outer periphery secured and sealed to the gauge body, a bellows connected between the end of the load pin and the elastic member adjacent the aperture to complete the closure of the passage, said elastic member, elastic system and load pin being so related that the connection of the bellows to the member is moved in response to pressure substantially the same amount as is the end of the load pin whereby the bellows does not substantially affect the movement of the load pin.

6. In a pressure gauge, an elastic system including a bodily movable part responsive to the force of the pressure to be gauged to be moved thereby and flex said system, means directing the application of pressure to the bodily movable part, said means including a bellows with a portion engaging said part and adapted to move therewith, a flexible sealing member secured to the bellows remote from said elastic system and with said bellows forming a flexible wall to serve as part of the means for retaining the pressure to be gauged, said flexible sealing member and bodily movable part being so constructed and arranged as to be movable independently of each other but substantially equal amounts in the same direction in response to any given pressure, and means responsive to movement of said bodily movable part for indicating flexure of said elastic system.

HERBERT ALLEN.

REFERENCES CITED

The following references are of record in the file of this patent:

UNITED STATES PATENTS

| Number | Name | Date |
| --- | --- | --- |
| 15,624 | Shaler | Aug. 26, 1856 |
| 16,428 | Allen | June 20, 1857 |
| 1,391,077 | Richter | Sept. 20, 1921 |
| 1,406,616 | Cutts | Feb. 14, 1922 |
| 1,761,130 | Kennedy | June 3, 1930 |
| 1,859,089 | Holmes | May 17, 1932 |
| 2,297,679 | Allen | Oct. 6, 1942 |